United States Patent [19]

Jaconette, Jr.

[11] E Re. 29,752

[45] Reissued Sep. 5, 1978

[54] GROUNDING CLIP FOR ELECTRICAL FIXTURES

[75] Inventor: Frank C. Jaconette, Jr., Trumbull, Conn.

[73] Assignee: Harvey Hubbell, Incorporated, Orange, Conn.

[21] Appl. No.: 683,519

[22] Filed: May 5, 1976

Related U.S. Patent Documents

Reissue of:

[64] Patent No.: 3,810,069
Issued: May 7, 1974
Appl. No.: 278,772
Filed: Aug. 8, 1972

[51] Int. Cl.[2] ..... H01R 3/06

[52] U.S. Cl. ..... 339/14 R; 16/2; 24/73 B; 85/80; 151/41.75

[58] Field of Search ..... 339/14 R; 24/73 B, 73 SC, 24/73 SB, 73 SM; 16/2, 3; 151/41.75; 85/80

[56] References Cited

U.S. PATENT DOCUMENTS

| | | | |
|---|---|---|---|
| 1,690,078 | 10/1928 | Pierce | 151/41.75 |
| 2,672,905 | 3/1954 | Hartman et al. | 151/41.75 |
| 3,376,612 | 4/1968 | Munse | 24/73 SC |
| 3,426,818 | 2/1969 | Derby | 151/41.75 |
| 3,713,071 | 1/1973 | Poliak et al. | 339/14 R |
| 3,723,941 | 3/1973 | Schumacher et al. | 339/14 R |
| 3,723,942 | 3/1973 | Dennison | 339/14 R |
| 3,757,268 | 9/1973 | Genovese et al. | 339/14 R |
| 3,810,069 | 5/1974 | Jaconette, Jr. | 339/14 R |

*Primary Examiner*—Roy Lake
*Assistant Examiner*—DeWalden W. Jones
*Attorney, Agent, or Firm*—Jerry M. Presson

[57] ABSTRACT

Apparatus for providing a reliable grounding path between electrical fixtures and their mounting boxes, particularly where modifications to the conventional nature of the electrical fixtures are unnecessary. A metal clip is disposed as a conductive interface between the mounting yoke of the electrical fixture and the mounting screw utilized to secure the electrical fixture within the mounting box. Low resistance electrical contacts are maintained by disposing spring members on the clip to exert continual contact pressure against both the mounting yoke and the mounting screw. Sharp protrusions extend from the clip to concentrate the contact pressure exerted against the mounting yoke and the mounting screw is engaged by a screw-receiving means on the clip. A spring means is disposed within the screw receiving means to develop the contact pressure and also provides for self-adjustabliity to pitch variations of the mounting screws or to fixed pitch references of the mounting box.

19 Claims, 7 Drawing Figures

Fig. 1.
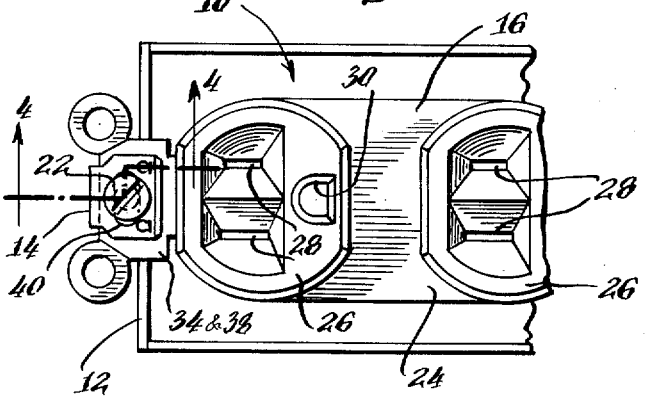
Fig. 5.
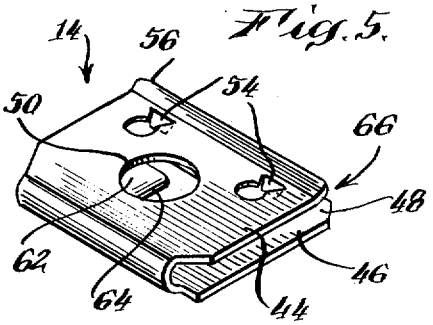
Fig. 2.
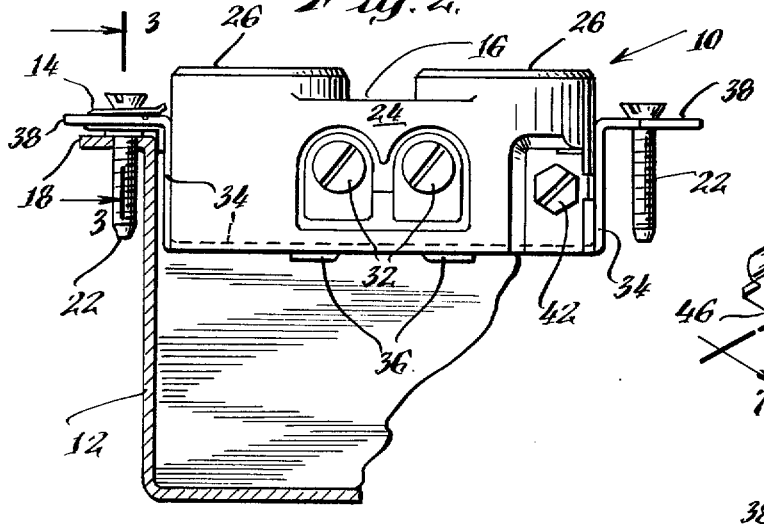
Fig. 6.
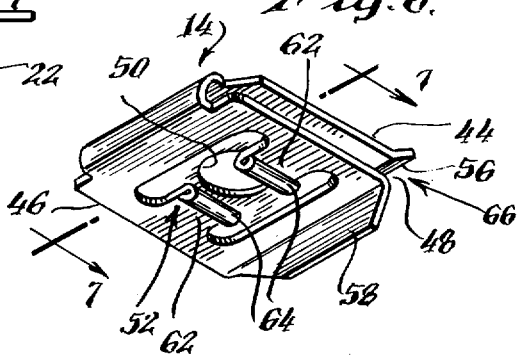
Fig. 4.
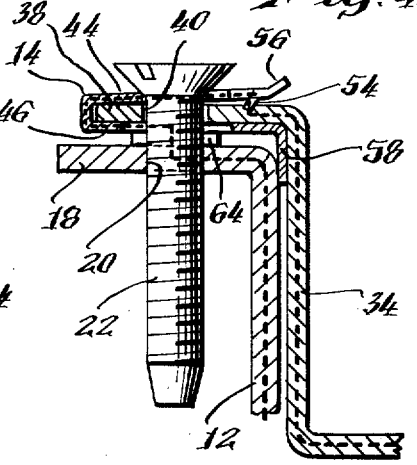
Fig. 3.
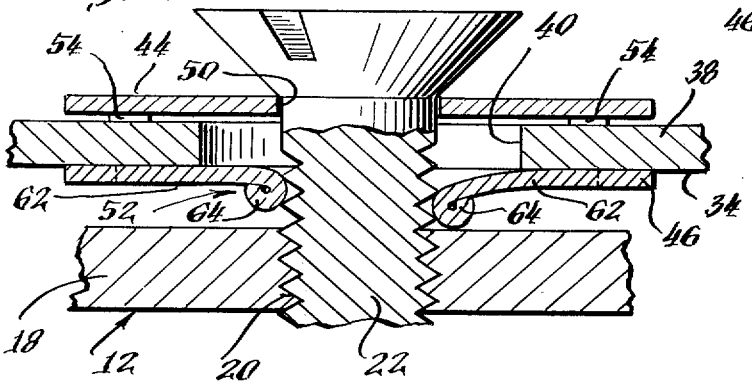
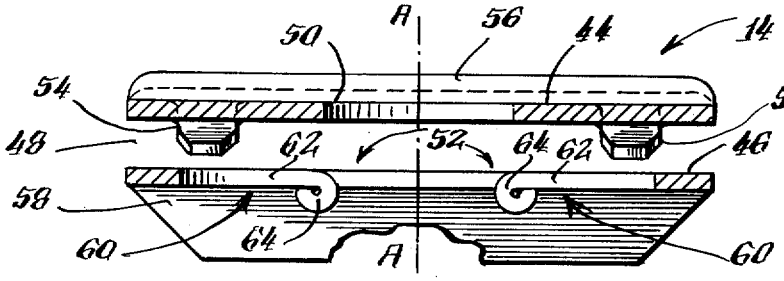
Fig. 7.

GROUNDING CLIP FOR ELECTRICAL FIXTURES

Matter enclosed in heavy brackets [ ] appears in the original patent but forms no part of this reissue specification; matter printed in italics indicates the additions made by reissue.

BACKGROUND OF THE INVENTION

The present invention relates to grounding apparatus for electrical fixtures and especially such apparatus which affixes directly to the electrical fixture without modification thereof. Hitherto, many different devices have been utilized to provide a grounding path between an electrical fixture and its mounting box. The most conventional approach has been to establish this path with a bonding jumper which requires that a wire be attached to both the electrical fixture and the mounting box for providing an electrical interface therebetween. This approach is very time consuming and even where sufficient time has been allotted for the incorporation of the bonding jumper, it is inadvertently disregarded on occasion to thereby result in a hazardous condition.

Another approach is to establish the grounding path by abutting the mounting yoke of the electrical fixture directly against the mounting box to achieve a metal-to-metal surface contact therebetween. Such a metal-to-metal abutment is not possible in all mounting arrangements between electrical fixtures and mounting boxes and therefore, this approach is limited to particular applications. It is also true, that the contact resistance resulting at such an abutment between surfaces is very susceptible to drastic increases from adverse circumstances and therefore, the reliability of the grounding path established thereby is very low.

Specially configured metallic clips are utilized in some applications to establish the grounding path. Disadvantages accompanying the use of these clips to achieve a low resistance grounding path between the electrical fixtures and the mounting box. One such clip is that disclosed in U.S. Pat. No. 3,432,793 which is fixedly attached to the electrical fixture and exerts a spring bias against the mounting screw. Being fixedly attached, this clip can only be utilized if the electrical fixture is modified, therefore, it increases manufacturing costs appreciably and can not be applied directly to conventional electrical fixtures. Another such clip is that disclosed in my U.S. Pat. No. 3,663,919 which presents a protruding member to be forcibly wedged between the electrical fixture and the mounting box. Although this clip is highly regarded for its intended purpose, once it is installed, the electrical fixture becomes more difficult to remove from the mounting box and thereby may present a problem during maintenance.

SUMMARY OF THE INVENTION

It is therefore a general object of the present invention to provide a grounding path between an electrical fixture and a mounting box with a clip which minimizes and obviates the disadvantages of the prior art.

It is a specific object of the present invention to provide a grounding path between an electrical fixture and a mounting box with a clip which may be applied directly to the electrical fixture without modification thereof.

It is a more specific object of the present invention to provide a grounding path between an electrical fixture and a mounting box with a clip which in no way inhibits the removal of the electrical fixture from the mounting box.

It is another object of the present invention to provide a grounding path between an electrical fixture and a mounting box with a clip which exerts a continual contact pressure against both the electrical fixture and the mounting screw securing the fixture to the box.

It is still another object of the present invention to provide a grounding path between an electrical fixture and a mounting box with a clip which includes a screw-receiving means of self-adjusting pitch.

It is a further object of the present invention to provide a grounding path between an electrical fixture and a mounting box with a clip having protrusions which intensify the contact pressure on the electrical fixture.

These objects are accomplished in one form according to the present invention by arranging the members of a U-shaped clip to forcibly grip across the mounting yoke thickness of conventional electrical fixtures. An aperture is disposed through one member of the clip in alignment with a screw-receiving means through the other member. Protrusions are disposed on either member to project into the gap separating the members and serve to facilitate the electrical contact achieved with the mounting yoke. Cooperating cantilever springs are incorporated into the screw receiving means and exert a force against the mounting screw regardless of its pitch variation or the pitch reference established by the fixed threads within the mounting box.

BRIEF DESCRIPTION OF THE DRAWING

The manner in which these and other objects of the invention are achieved will be best understood by reference to the following description, the appended claims, and the FIGS. of the attached drawing wherein:

FIG. 1 is a partial top view of an electrical fixture mounted into a mounting box with the grounding clip of this invention incorporated therebetween;

FIG. 2 is a side view thereof with portions of the mounting box cutaway to illustrate the electrical continuity existing between the ground terminal of the electrical fixture and the mounting yoke thereof.

FIG. 3 is an enlarged partial sectional view thereof, taken substantially along line 3—3 of FIG. 2 to illustrate the self-adjusting pitch feature of the grounding clip and the concentrated contact pressure attained with the protrusions thereof;

FIG. 4 is an enlarged partial sectional view thereof, taken substantially along line 4—4 of FIG. 1 to illustrate the conductive path provided between the electrical fixture and the mounting box by the grounding clip;

FIG. 5 is a top perspective view of the grounding clip;

FIG. 6 is a bottom perspective view thereof; and

FIG. 7 is an enlarged sectional view thereof taken substantially along the line 7—7 of FIG. 6 to illustrate the relative disposition of the screw-receiving means and the protrusions thereon.

DESCRIPTION OF THE PREFERRED EMBODIMENT

Turning now to the drawing, and more particularly to FIGS. 1 and 2, there is illustrated an electrical fixture 10 which is secured into a mounting box 12 with a grounding clip 14 disposed therebetween in accordance with this invention. Any suitable electrical fixture 10 could be secured into the mounting box 12 but by way of example, a standard duplex receptacle outlet 16 has been chosen for use in this disclosure. To eliminate the safety hazard which would otherwise exist, the grounding clip 14 provides for the electrical continuity necessary to achieve a grounding path between the outlet 16 and the mounting box 12.

In general configuration, the mounting box 12 is an open ended enclosure, having rectangular sides. The mounting box 12 is fabricated of conductive metal and is electrically grounded by suitable means, such as connection to a water pipe (not shown). A mounting flange 18 is provided on the mounting box 12 and has threaded aperture 20 which engage with mounting screws 22 in securing the outlet 16 to the mounting box 12.

The outlet 16 has a generally compatible configuration to that of the mounting box 12 and includes a body 24 made of suitable insulating material, such as moldable plastic. At the front of the body 24, identical but separate grounded receptacles 26 are disposed. Each receptacle 26 includes a pair of spaced slots 28 associated with internal female contacts (not shown) and a semi-circular opening 30 associated with an internal female grounding contact (not shown). The female contacts mate with the male contacts of a plug and the female grounding contact mates with the male grounding contact on the plug. Screws 32 comprise suitable terminal means for connecting wire conductors to the female contacts and thereby provide for electrically energizing the receptacles 26. A metallic mounting yoke 34 extends across the rear of the body 24 and is affixed thereto by any suitable means, such as folding tabs 36. The mounting yoke 34 is also configured to extend along both sides of the body 24 and project laterally therefrom to each side thereof to form mounting ears 38. An elongated slot 40 is disposed through each mounting ear 38 to permit passage of the mounting screw 22 in alignment with the threaded aperture 20 of the mounting box 12. A grounding screw 42 comprises suitable terminal means for connecting a ground wire to the mounting yoke 34 which in turn is electrically connected by suitable means (not shown) to the female grounding contacts within the receptacles 26.

The grounding clip 14 is made of resilient, conductive material, such as a spring metal strip, in a generally U-shaped configuration which includes an upper plate-like member 44 and a lower plate-like member 46, with reference to and as illustrated in FIGS. 5–7. The members 44 and 46 are connected to each other at an adjacent end of each, and separated by a gap 48 of less magnitude than the thickness of the mounting ear 38. An aperture 50 is formed in the upper member 44 and a screw-receiving means 52 for engaging with the threads of the mounting screw 22 is disposed through the lower member 46, with the longitudinal axes of both the apertures 50 and the screw-receiving means 52 aligned along a common axis A-A. Protrusions 54 extend into the gap 48 from the upper member 44 and the termination of each member 44 or 46 is configured to diverge relative to the other member 44 or 46 in that an inclined tip 56 is disposed on the upper member 44 and a locating flange 58 is disposed on the lower member 46. A spring means 60 of suitable construction, such as cooperating cantilever members 62, is incorporated into the screw receiving means 52 and a rolled tip 64 is disposed at the end of each cantilever member 62

In use the grounding clip 14 is applied to the mounting yoke 34 of the outlet 16 by forcibly directing one of the mounting ears 38 thereof into the gap 48 separating the upper member 44 from the lower member 46. A guided entrance 66 is created by the complementary contours of the inclined tip 56 and the locating flange 58 of the members 44 and 46 respectively, and serves to facilitate the initial insertion of the mounting ear 38 therebetween. The members 44 and 46 are deflected in opposite directions by this insertion which thereby results in contact pressures being exerted against each side of the mounting ear 38. Throughout insertion, the grounding clip 14 is manipulated to align the common axis A—A through the slot 40 in the mounting ear 38. Being disposed within the gap 48, the protrusions 54 present a relatively small contact area against the surface of the mounting ear 38, as illustrated in FIG. 3, and thereby concentrate the contact pressure. The protrusions 54 may have any suitable configuration which depends on the contact pressure to be derived from the deflection attained by the members 44 and 46. Where the protrusions 54 are configured to derive a very large contact pressure, the surface of the mounting ear 38 is scraped thereby to penetrate any nonconductive substances thereon, and results in a decreased electrical contact resistance. When assembled, clip 14 is separably mounted on a mounting ear 38.

The outlet 16 is then placed into the mounting box 12 with the common axis A—A of the grounding clip 14 aligned along the axis of one threaded aperture 20 in the mounting flange 18. The mounting screw 22 is then inserted along the axis of the threaded aperture 20 and turned to secure the outlet 16 in the mounting box 12. As the mounting screw 22 is turned, the threads thereof engage into both the screw-receiving means 52 of the grounding clip 14 and the threaded aperture 20. On the screw-receiving means 52, the rolled tips 64 are configured and disposed to engage between the threads of the mounting screw 22 and thereby establish electrical continuity therebetween, as illustrated in FIG. 3. The spring means 60 is disposed on the screw-receiving means 52 for exerting contact pressure against the threads of the mounting screw 22 in that the cooperating cantilever members 62 thereof are forced to deflect as the mounting screw 22 is inserted therebetween. This contact pressure is exerted through the rolled tips 64 which are forcibly abutted against the threads of the mounting screw 22 and therefore, a decreased electrical contact resistance is accomplished between the grounding clip 14 and the mounting screw 22. Due to the deflectable nature of the cantilever members 62, the screw-receiving means 52 is also self-adjusting the pitch variations between threads on the mounting screw 22 and to fixed pitch references established by the threaded apertures 20 in the mounting box 12. Although a plurality of cantilever members 62 are shown, where desired the spring means 60 could be arranged from a single cantilever member.

The grounding path through which electrical continuity is established between the electrical fixture 10 and the mounting box 12 is illustrated by the dotted line in FIG. 4. At the mounting ear 38, the protrusions 54 are forced to bear against the surface thereof and thereby establish a low resistance interface therebetween. Since the grounding clip 14 is made of conductive material and the protrusions 54 are an integral portion thereof, electrical continuity exists from the protrusions 54 into the upper member 44 and through to the rolled tips 64 on the cantilever members 62 of the lower member 46. The rolled tips 64 are forced to bear against the threads of the mounting screw 22 and thereby a low resistance interface is established therebetween. Within the threaded aperture 20 of the mounting box 12, the engaging threads of the mounting screw 22 establish a low resistance interface which is retained under a contact pressure by the forces required to secure the outlet 16 into the mounting box 12.

It should be readily appreciated by those skilled in this art that the clip embodied by this invention may be applied directly to an electrical fixture without the modification thereof and utilized to accomplish a reliable grounding path between the electrical fixture and a mounting box. Also, the clip exerts continual contact pressure on the electrical interfaces without inhibiting the removal of the electrical fixture from the mounting box and protrusions are disposed on the clip to intensify the contact pressure exerted against the electrical fixture. Furthermore, the screw-receiving means of the clip is self-adjusting to the pitch variations between the threads of the mounting screw and to fixed pitch references of the threads within the box.

It should be understood that the present disclosure has been made only by way of example and that numerous changes in details of construction and the combination or arrangement of parts may be resorted to without departing from the true spirit and the scope of the invention, and therefore the present disclosure should be construed as illustrative rather than limiting.

What I claim is:

1. A grounding clip for use with an electrical fixture of the type having a grounded mounting yoke by which the fixture is secured to a mounting box with mounting screws extending through slots in the mounting yoke, said grounding clip [comprising:] *consisting of* a U-shaped spring having a first member and a second member, said members being substantially flat planar members, said members being separated by a gap of lesser magnitude than the thickness of the mounting yoke, said first member including an aperture, said second member including screw-receiving means aligned with said aperture for engaging a mounting screw, said screw-receiving means including a pair of cantilever arms, said grounding clip being mountable on the mounting yoke of the electrical fixture with said members forcibly bearing against the mounting yoke to establish electrical continuity therebetween and with said aperture and said screw-receiving means aligned with one of the mounting yoke slots to receive a mounting screw, said cantilever arms being deflectable *and having ends which, in plan, follow straight-line paths at least in the regions where they contact the threads of the mounting screw* to slide over and forcibly abut against the threads of the mounting screw in maintaining electrical continuity therebetween as the mounting screw is axially engaged into said screw-receiving means.

2. The grounding clip of claim 1 wherein *at a location spaced from said aperture* protrusions extend [into said gap] from one of said members *toward the other to define said gap between the ends of said protrusions and the opposing surface of said other member*, said protrusions being effective to concentrate the contact pressure exerted against the mounting yoke and thereby decrease the electrical contact resistance therebetween.

3. The grounding clip of claim 1 wherein rolled tips are disposed on said screw-receiving means, said rolled tips being configured to engage [between] threads on the mounting screw and effectuate the electrical continuity.

4. The grounding clip of claim 1 wherein diverging terminations are disposed on said members, said terminations being effective to facilitate the disposition of said grounding clip on the mounting yoke.

5. The grounding clip of claim 1 wherein protrusions extend [into said gap] from one of said members *toward the other to define said gap between the ends of said protrusions and the opposing surface of said other member*, said protrusions being effective to concentrate the contact pressure exerted against the mounting yoke and thereby decrease the electrical contact resistance therebetween; rolled tips are disposed on said screw-receiving means, said rolled tips being configured to engage [between] threads on the mounting screw and effectuate the electrical continuity; diverging terminations are disposed on said members, said terminations being effective to facilitate the disposition of said grounding clip on the mounting yoke.

6. In an electrical fixture of the type adapted to be mounted in an electrically grounded metal mounting box, wherein a metallic mounting yoke supports an insulated body and is connected to a grounding contact within said body, said mounting yoke having at least one mounting ear extending therefrom, said mounting ear containing a slot to receive a mounting screw therethrough in securing said electrical fixture into the mounting box, the improvement comprising:

a grounding clip detachably affixed to said mounting ear, said grounding clip [being] *consisting of* a U-shaped spring, said spring having a first member and a second member, said members being substantially flat planar members, said members being separated by a gap of lesser magnitude than the thickness of said mounting ear, said first member including an aperture, said second member including screw-receiving spring means aligned with said aperture for engaging the mounting screw, said grounding clip being detachably retained on said mounting ear with said members forcibly bearing thereagainst to establish electrical continuity therebetween and with said aperture and said screw-receiving means aligned with said slot, said screw-receiving spring means being deflectable *and having ends which, in plan, follow straight-line paths at least in the regions where they contact the threads of the mounting screw* to slide over and forcibly abut against the threads of the mounting screw in maintaining electrical continuity therebetween as the mounting screw is axially engaged thereinto.

7. The combination of claim 6 wherein said screw-receiving spring means includes a pair of cantilever arms.

8. The combination of claim 7 wherein *at a location spaced from said aperture* protrusions extend [into said gap] from one of said members *toward the other to define said gap between the ends of said protrusions and the opposing surface of said other member*, said protrusions being effective to concentrate the contact pressure exerted against said mounting yoke and thereby decrease the electrical contact resistance therebetween.

9. The combination of claim 7 wherein rolled tips are disposed on said cantilever arms, said rolled tips being configured to engage [between] threads on the mounting screw and effectuate the electrical continuity.

10. The combination of claim 7 wherein diverging terminations are disposed on said members, said terminations being effective to facilitate the disposition of said grounding clip on said mounting yoke.

11. The combination of claim 7 wherein protrusions extend [into said gap] from one of said members *toward the other to define said gap between the ends of said protrusions and the opposing surface of said other member,* said protrusions being effective to concentrate the contact pressure exerted against said mounting yoke and thereby decrease the electrical contact resistance therebetween; rolled tips are disposed on said cantilever arms, said rolled tips being configured to engage [between] threads on the mounting screw and effectuate the electrical continuity; and diverging terminations are disposed on said members, said terminations being effective to facilitate the disposition of said grounding clip on said mounting yoke.

*12. A detachable grounding clip for use with an electrical device of the type employing a conductive mounting yoke for securing the device to a mounting box by means of mounting screws having threads which follow a predetermined helical path extending through open areas in the mounting yoke, said grounding clip consisting of a U-shaped conductive member having first and second substantially flat planar side members joined together at one end to form the U-shape, said first side member including an aperture therethrough, said second side member including an apertured screw-receiving means integral therewith and aligned with the aperture in said first side member, said screw-receiving means including a plurality of arms extending toward one another to provide opposed free edges with an aperture therebetween for engaging threaded portions of a mounting screw passing through the apertures in said first and second members, said grounding clip being detachably mountable on the mounting yoke with the apertures therethrough aligned with one of the open areas of the mounting yoke to receive a mounting screw, at least one of said arms being cantilevered and deflectable to facilitate insertion of the mounting screw and engagement and electrical continuity with its threads, said arms having ends which follow paths substantially different from the predetermined path of the threads of the mounting screw to facilitate sliding over said threads, the spacing between the closest points of any portions of said opposing side members, before being mounted on the yoke, being less than the thickness of the yoke, whereby when the clip is inserted on the yoke it bears forcibly against opposite surfaces of the yoke to maintain electrical continuity between the screw-receiving means and the yoke.*

*13. A detachable grounding clip as defined in claim 12 wherein the opposed free edges of said arms are substantially parallel to one another.*

*14. A detachable grounding clip for use with an electrical device of the type employing a conductive mounting yoke for securing the device to a mounting box by means of mounting screws extending through apertured areas in the mounting yoke, said grounding clip comprising a U-shaped conductive member having first and second substantially flat planar side members joined together at one end to form the U-shape, said first side member including an aperture therethrough, said second side member having an aperture aligned with the aperture in said first side member, the aperture through said second side member having two opposing and substantially parallel edges for receiving and contacting and sliding over the threads of a mounting screw passing through the aperture in the first member, at least one of said edges being deflectable by the mounting screw to facilitate receiving and engaging the threaded portion thereof, said grounding clip being detachably mountable on the mounting yoke with the apertures therethrough aligned with one of the apertures of the mounting yoke to receive the mounting screw, said parallel edges facilitating insertion of the mounting screw and maintaining electrical continuity with its threads, at least one protuberance formed on at least one of said side members and projecting toward the other side member, the spacing between the protuberance and the closest surface of the opposing side member, before being mounted on the yoke, being less than the thickness of the yoke, whereby when the clip is inserted on the yoke electrical continuity is established between the clip and the yoke at least by way of said protuberance.*

*15. A detachable grounding clip as defined in claim 14 wherein the parallel opposite edges defining the aperture through the second side member constitute the only surfaces of said clip which contact the threaded portion of the mounting screw.*

*16. A detachable grounding clip for use with an electrical device of the type employing a conductive mounting yoke for securing the device to a mounting box with mounting screws extending through open areas in the mounting yoke, said grounding clip comprising a U-shaped spring having a first member and a second member, the members being substantially flat planar members separated by a gap and at least one of said members having an outwardly diverging end for facilitating initial insertion of the clip on the yoke, said first member including an aperture, said second member including screw-receiving means integral therewith and having an aperture aligned with the aperture in said first member, said screw-receiving means including a plurality of integral arms extending toward one another to form the aperture in said second member, said arms providing substantially parallel, opposed, spaced-apart free ends for engaging and sliding over threaded portions of a mounting screw, said grounding clip being detachably mountable on the mounting yoke with the apertures in the first and second members aligned with one of the openings in the mounting yoke to receive the mounting screw, the free ends of said arms being rolled and at least one being deflectable to facilitate sliding engagement with the threads of the mounting screw and to maintain electrical continuity therebetween when the mounting screw is engaged by said screw-receiving means, a plurality of protuberances projecting from at least one of said members toward the other, said protuberances located adjacent the area where at least one of said members diverges and having inclined surfaces to facilitate the insertion of the clip on the yoke, the spacing between the innermost ends of said protuberances and the closest surface of the opposing member being less than the thickness of the mounting yoke before the clip is mounted thereon, whereby when the clip is yieldably inserted on the yoke electrical continuity is established between the screw-receiving means and the yoke at least by way of said protuberances.*

*17. A detachable grounding clip for use with an electrical device having a conductive mounting yoke for securing the device to a conductive mounting box by means of conductive mounting screws extending through slots in the yoke, said grounding clip consisting of a U-shaped conductive member having first and second substantially planar side members joined together at one end to form a U-shape, said first side member including an aperture therethrough, said second side member including screw receiving and supporting means integral therewith and having an aperture aligned with the aperture in said first side member, said screw receiving and supporting means including a pair of integral arms having cooperating and opposing surfaces forming the aperture in said second side member, said*

*opposing surfaces lying along a non-helical path and being shaped complementary to one another and dimensioned to receive and make sliding contact with a mounting screw passing through the aperture in the first side member, and being deflectable by said mounting screw to facilitate receiving and slidingly engaging the threaded portion thereof, said grounding clip being detachably mountable on the mounting yoke with said apertures therethrough aligned with one of the slots of the mounting yoke to receive the mounting screw, said arms maintaining electrical continuity with said mounting screw, the spacing between the closest points of said opposing side members, before the clip is mounted on the yoke, being less than the thickness of the yoke, whereby said side members maintain pressing contact with the opposite surfaces of the yoke.*

*18. A grounding clip as in claim 17 wherein at least one of said side members is flared at the open end of the U-shape to facilitate mounting on the yoke.*

*19. A detachable grounding clip for use with an electrical device having a conductive mounting yoke for securing the device to a conductive mounting box by means of conductive mounting screws extending through slots in the yoke, said grounding clip consisting of a U-shaped conductive member having first and second side members joined together at one end to form a U-shape, said first side member including an open area therein, said second side member including screw receiving and supporting means integral therewith and having an aperture aligned with the open area in said first side member, said screw receiving and supporting means including a pair of substantially coplanar arms having cooperating opposing surfaces lying along a non-helical path and forming the aperture in said second side member, the aperture in the second side member being smaller than the open area in the first side member and smaller than the shank of the mounting screws to be received, at least one of said arms being deflectable by the mounting screw to receive the screw in sliding engagement and maintain a pressing contact with said screw, said grounding clip being detachably mountable on the mounting yoke with the aperture in the second side member aligned with one of the slots of the mounting yoke to receive the mounting screw, the spacing between the closest points of said opposing side members, before the clip is mounted on the yoke, being less than the thickness of the yoke, whereby said side members span the yoke in pressing contact with the opposite surfaces thereof.*

* * * * *